United States Patent
Syeda-Mahmood et al.

(10) Patent No.: US 12,548,296 B2
(45) Date of Patent: Feb. 10, 2026

(54) SPATIALLY PRESERVING FLATTENING IN DEEP LEARNING NEURAL NETWORKS

(71) Applicant: International Business Machines Corporation, Armonk, NY (US)

(72) Inventors: Tanveer Syeda-Mahmood, Cupertino, CA (US); Neha Srivathsa, Mercer Island, WA (US); Raziuddin Mustafa Mahmood, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 646 days.

(21) Appl. No.: 17/895,857

(22) Filed: Aug. 25, 2022

(65) Prior Publication Data
US 2024/0071049 A1    Feb. 29, 2024

(51) Int. Cl.
| G06V 10/77 | (2022.01) |
| G06V 10/44 | (2022.01) |
| G06V 10/764 | (2022.01) |
| G06V 10/82 | (2022.01) |

(52) U.S. Cl.
CPC ........ G06V 10/7715 (2022.01); G06V 10/449 (2022.01); G06V 10/764 (2022.01); G06V 10/82 (2022.01)

(58) Field of Classification Search
CPC ............. G06V 10/7715; G06V 10/449; G06V 10/764; G06V 10/82
See application file for complete search history.

(56) References Cited

U.S. PATENT DOCUMENTS

| 10,347,010 B2 | 7/2019 | Risman et al. |
| 2020/0320685 A1 | 10/2020 | Anssari Moin et al. |
| 2021/0051322 A1* | 2/2021 | Coelho ............... H04N 19/147 |

(Continued)

FOREIGN PATENT DOCUMENTS

| CN | 106408017 A | 2/2017 |
| CN | 110119772 A | 8/2019 |

(Continued)

OTHER PUBLICATIONS

Syeda-Mahmood, Tanveer et al., "Extracting and Learning Fine-Grained Labels from Chest Radiographs", Nov. 2020, AMIA Annual Symposium Proceedings, vol. 2020 (Year: 2020).*

(Continued)

*Primary Examiner* — Chan S Park
*Assistant Examiner* — Daniel C Chang
(74) *Attorney, Agent, or Firm* — Teddi E. Maranzano

(57) ABSTRACT

Techniques for spatially preserving flattening in deep learning neural networks are provided. In one aspect, a spatially preserving flattening module includes: a predictor for generating image feature maps from at least one convolutional layer of a feature extraction phase of a deep learning neural network applied to input image data; an auto-encoder for producing encodings of the image feature maps that preserve location and shape information associated with objects in the input image data; and a flattener for concatenating the encodings of the image feature maps to form a spatially preserving flattened encoding vector. A deep learning neural network that includes the present spatially preserving flattening module is also provided, as is a method for spatially preserving flattening.

13 Claims, 9 Drawing Sheets

(56) References Cited

U.S. PATENT DOCUMENTS

| | | | |
|---|---|---|---|
| 2021/0073617 A1* | 3/2021 | Bazzani | ............ G06N 3/045 |
| 2021/0209410 A1 | 7/2021 | Pan | |
| 2022/0108070 A1 | 4/2022 | Syeda-Mahmood | |

FOREIGN PATENT DOCUMENTS

| | | | | |
|---|---|---|---|---|
| CN | 107145860 B | | 11/2019 | |
| CN | 106991440 B | | 12/2019 | |
| CN | 108764084 B | | 7/2021 | |
| CN | 116071815 A | * | 5/2023 | ............ G06V 40/20 |

OTHER PUBLICATIONS

Carion et al., "End-to-End Object Detection with Transformers," arXiv:2005.12872v3 (May 2020) (26 pages).

Agu et al., "AnaXNet: Anatomy Aware Multi-label Finding Classification in Chest X-ray," In International Conference on Medical Image Computing and Computer-Assisted Intervention, Springer, Cham, May 2021 (11 pages).

Kashyap et al., "Looking in the Right Place for Anomalies: Explainable Ai Through Automatic Location Learning," Proceedings—International Symposium on Biomedical Imaging, vol. 2020—April, pp. 1125-1129, 4 (Apr. 2020) (6 pages).

Mohammad Tariqul Islam et al., "Abnormality Detection and Localization in Chest X-Rays using Deep Convolutional Neural Networks," arXiv:1705.09850v3 (Sep. 2017) (16 pages).

Neha Srivathsa et al., "Spatially-Preserving Flattening for Location-Aware Classification of Findings in Chest X-Rays," arXiv:2204.09676v1 Apr. 19, 2022 (5 pages)—Grace Period Disclosure.

Mell et al., "The NIST Definition of Cloud Computing," NIST Special Publication 800-145, Sep. 2011 (7 pages).

He et al., "Deep Residual Learning for Image Recognition," in Proceedings of the IEEE Conference on Computer Vision and Pattern Recognition (CVPR), pp. 770-778 (Jun. 2016).

Irvin et al., "CheXpert: A Large Chest Radiograph Dataset with Uncertainty Labels and Expert Comparison," arXiv:1901.07031v1 (Jan. 2019) (9 pages).

Johnson et al., "MIMIC-CXR-JPG, A Large Publicly Available Database of Labeled Chest Radiographs," arXiv:1901.07042v5 (Nov. 2019) (7 pages).

Lin et al., "Focal Loss for Dense Object Detection," arXiv:1708.02002v2 (Feb. 2018) (10 pages).

Ren et al., "Faster R-CNN: Towards Real-Time Object Detection with Region Proposal Networks," arXiv:1506.01497v3 (Jan. 2016) (14 pages).

Ronneberger et al., "U-Net: Convolutional Networks for Biomedical Image Segmentation," in Proc. Medical Image Computing and Computer-Assisted Intervention (MICCAI), 2015, vol. 9351, pp. 234-241.

Sabour et al., "Dynamic Routing Between Capsules," Advances in Neural Information Processing Systems, Dec. 2017 (11 pages).

Simonyan et al., "Very Deep Convolutional Networks for Large-Scale Image Recognition," ICLR 2015 (Apr. 2015) (14 pages).

Syeda-Mahmood et al., "Chest X-ray Report Generation through Fine-Grained Label Learning," arXiv:2007.13831v1 (Jul. 2020) (11 pages).

Wang et al., "ChestX-ray8: Hospital-scale Chest X-ray Database and Benchmarks on Weakly-supervised Classification and Localization of Common Thorax Diseases," arXiv:1705.02315v5 (Dec. 2017) (19 pages).

Wu et al., "Comparison of Chest Radiograph Interpretations by Artificial Intelligence Algorithm vs Radiology Residents," JAMA Network Open, vol. 3, Oct. 2020 (14 pages).

Wu et al., Automatic Bounding Box Annotation of Chest X-ray Data For Localization of Abnormalities, 2020 IEEE 17th International Symposium on Biomedical Imaging (ISBI), pp. 799-803 (Apr. 2020).

Syeda-Mahmood et al., "Extracting and Learning Fine-Grained Labels from Chest Radiographs," arXIV:2011.09517 (Nov. 2020) (10 pages).

* cited by examiner

| Label | Images | Macro AUC | | |
|---|---|---|---|---|
| | | Network A | Network B | Network C |
| Elevated right hemidiaphragm | 1596 | 0.892 | 0.797 | 0.654 |
| Bilateral pleural effusion | 6696 | 0.823 | 0.793 | 0.71 |
| Pneumothorax in the left lower lobe | 4442 | 0.882 | 0.784 | 0.679 |
| Right lower lobe plural effusion | 44770 | 0.812 | 0.766 | 0.71 |

FIG. 8

| Method | Labels | Train | Test | Macro AUC | Weighted AUC |
|---|---|---|---|---|---|
| N1 | 57 | 75,613 | 20,941 | 0.512±0.025 | 0.573±0.022 |
| N2 | 457 | 75,613 | 20,941 | 0.729±0.001 | 0.716±0.002 |
| N2 | 57 | 75,613 | 20,941 | 0.74±0.003 | 0.723±0.012 |
| N3 | 57 | 75,613 | 20,941 | 0.81±0.001 | 0.79±0.002 |

FIG. 9

| Encoding size | AUC |
|---|---|
| 32 | 0.67±0.002 |
| 64 | 0.716±0.003 |
| 128 | 0.81±0.012 |
| 256 | 0.80±0.001 |

FIG. 10

SPATIALLY PRESERVING FLATTENING IN DEEP LEARNING NEURAL NETWORKS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S):

"Spatially-Preserving Flattening for Location-Aware Classification of Findings in Chest X-Rays," Neha Srivathsa, Razi Mahmood, Tanveer Syeda-Mahmood, arXiv:2204.09676v1 Apr. 19, 2022 (5 pages).

FIELD OF THE INVENTION

The present invention relates to deep learning neural networks, and more particularly, to techniques for preserving location and shape information through auto-encoding of feature maps during flattening in deep learning neural networks for location-sensitive classification.

BACKGROUND OF THE INVENTION

Deep learning is used in visual imagery analysis for tasks such as image classification and object detection. For instance, with image classification, deep learning may be used to predict the class of an object or objects in an input image such as 'cat,' 'dog,' etc.

Deep learning networks for image classification typically use architectures that do not guarantee the preservation of the spatial layout of images. While these architectures provide robustness to positional changes of objects in the images, there are situations where maintaining layout and spatial contiguity information through to classification is important. Anomaly detection in medical images is one such instance.

For example, detection and classification of anomalous findings in chest X-ray images requires the recognition of anomalies within the correct anatomical regions in order to be helpful. Unfortunately, existing deep learning networks for fine-grained anomaly classification use architectures where the spatial layout is lost.

Therefore, an improved deep learning network architecture that preserves location and shape information would be desirable.

SUMMARY OF THE INVENTION

The present invention provides techniques for preserving location and shape information through auto-encoding of feature maps during flattening in deep learning neural networks for location-sensitive classification. In one aspect of the invention, a spatially preserving flattening module is provided. The spatially preserving flattening module includes: a predictor for generating image feature maps from at least one convolutional layer of a feature extraction phase of a deep learning neural network applied to input image data; an auto-encoder for producing encodings of the image feature maps that preserve location and shape information associated with objects in the input image data; and a flattener for concatenating the encodings of the image feature maps to form a spatially preserving flattened encoding vector.

In another aspect of the invention, a deep learning neural network is provided. The deep learning neural network includes: a feature extractor for applying convolutional operations to input image data using filters; a spatially preserving flattening module having: a predictor for generating image feature maps using output from the filters, an auto-encoder for producing encodings of the image feature maps that preserve location and shape information associated with objects in the input image data, and a flattener for concatenating the encodings of the image feature maps to form a spatially preserving flattened encoding vector; and a classifier having a dense fully connected layer for classifying the objects in the input image data using the spatially preserving flattened encoding vector.

In yet another aspect of the invention, a method for spatially preserving flattening is provided. The method includes: obtaining at least one image feature map from at least one convolutional layer of a feature extraction phase of a deep learning neural network applied to input image data; and auto-encoding the at least one image feature map to produce an encoding of the at least one image feature map, where the auto-encoding preserves location and shape information associated with objects in the input image data.

A more complete understanding of the present invention, as well as further features and advantages of the present invention, will be obtained by reference to the following detailed description and drawings.

BRIEF DESCRIPTION OF THE DRAWINGS

FIG. 8 is a diagram illustrating frequently seen location-specific findings and the performance of various learning networks including the present spatially preserving deep learning neural network according to an embodiment of the present invention;

FIG. 9 is a diagram illustrating the performance of location and laterality classification models against a selected dataset using labels according to an embodiment of the present invention;

FIG. 10 is a diagram illustrating an ablation study on the size of the auto-encoding used for capturing the shapes of filters according to an embodiment of the present invention;

DETAILED DESCRIPTION OF PREFERRED EMBODIMENTS

Figure 1:
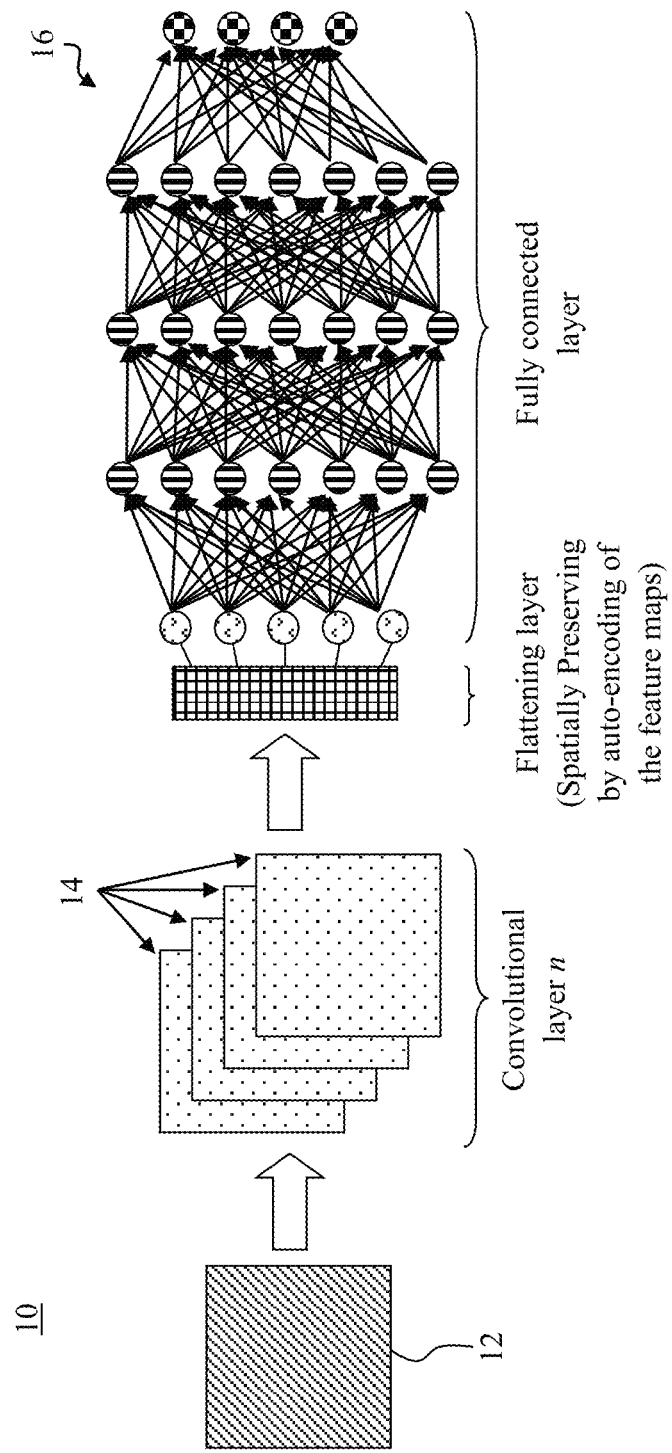
FIG. 1 is a schematic diagram illustrating an exemplary convolutional neural network according to an embodiment of the present invention.

As provided above, some deep learning applications require that layout and spatial contiguity information be maintained. By way of non-limiting example only, one such instance is anomaly detection in medical images where the recognition of anomalies within anatomical regions is required.

For instance, chest X-rays are the most common imaging exams done in emergency rooms and intensive care units in hospitals. Deep learning can be used to produce automated radiology reports from these x-ray images. Doing so, however, requires the recognition of fine-grained findings that describe the laterality (i.e., pertaining to one side of the body) as well as location of findings (e.g., "left basal atelectasis").

While it is possible to do general object detection and classification with modern deep learning networks in computer vision, fine-grained finding recognition is different as it requires that the anomaly be located within the correct anatomical reference (e.g., pneumothorax in left apex). Further, certain anomalies only appear in specific anatomical regions, requiring the modeling of these constraints (e.g., opacities are seen in lungs).

As will be described in detail below, a classifier approach is employed herein for fine-grained anomaly classification. However, unlike conventional direct classification approaches that lose spatial contiguity during a flattening step prior to classification, the present techniques use auto-encoding of feature maps during flattening to preserve location and shape information.

Deep learning neural networks such as a convolutional neural network can be used in visual imagery analysis for tasks such as image classification. Convolutional neural networks are inspired by the biological neural networks of animals, and in particular the brain. Convolutional neural networks may be used to estimate or approximate systems and cognitive functions that depend on a large number of inputs and weights of the connections which are generally unknown.

Convolutional layers are the main building blocks of a convolutional neural network. Each convolutional layer processes input (e.g., input images) through a set of filters (or kernels) which applies a convolution operation to the input images, producing a feature map (also referred to herein as an 'activation map') for each of the filters that map the relevant features detected or preserved by the filters. The results are then passed to the next layer in the convolutional neural network, and so on. Pooling is used to merge the data from the feature maps at each of the convolutional layers. In addition to reducing overall computation time, pooling also helps to extract the most meaningful data by eliminating noise. A flattening layer then converts this data into a one-dimensional array for the next layer. Namely, the output of the convolutional layers is flattened to create a single feature vector that is provided to the final fully-connected layer. See, for example, convolutional neural network 10 shown in FIG. 1.

Namely, as shown in FIG. 1, at a first convolutional layer (n=1) of convolutional neural network 10, a set of filters is used to apply a convolution operation to an input image 12, thereby producing image feature maps (or simply 'feature maps') 14, one for each of the filters. The results are then passed to the next convolutional layer in convolutional neural network 10. This process is repeated through the n=2, 3, 4, etc. convolutional layers of convolutional neural network 10. These convolutional filtering operations are part of a feature extraction stage of convolutional neural network 10.

A flattening layer then converts the output of the n convolutional layers into a one-dimensional single feature vector for a fully connected layer. See FIG. 1. This is the last stage of the convolutional neural network 10. Namely, the fully connected layer serves as a classification model 16 for the image classification tasks. In other words, flattening is used to convert all of the resulting multi-dimensional arrays from the feature maps 14 into a one-dimensional continuous linear vector. The flattened matrix is provided as input to the fully connected layer (also referred to herein as the dense layer) in order to classify the input image 12. Neurons in the fully connected layer apply a linear transformation to the input vector through a weight matrix.

In order to prevent overfitting, a dropout layer can be implemented to nullify the contribution of some neurons towards the next layer, without modifying any other neurons. Overfitting occurs when a statistical model fits exactly against its training data. When this occurs, the algorithm may not perform accurately against unseen data which is undesirable. A dropout layer is often placed on the fully connected layer since it has the greatest number of parameters.

With existing deep learning networks for image classification, spatial contiguity is lost during flattening. Namely, although the feature extraction operations using convolutional filters are applied at a pixel level or even a super-pixel level, the output is ultimately flattened into vectors before proceeding to the classification stage, resulting in the loss of spatial contiguity and layout information. This can be easily seen through the examples shown illustrated in FIG. 2. For instance, the two-dimensional layout 22 in FIG. 2 makes it trivial to see the arrangement as representing the number 1. Namely, in the two-dimensional layout 22, all of the 1's are in a column layout, hence visually, one can easily perceive the number 1. However, with the corresponding flattened representation 24, that layout information is lost.

Figure 2:
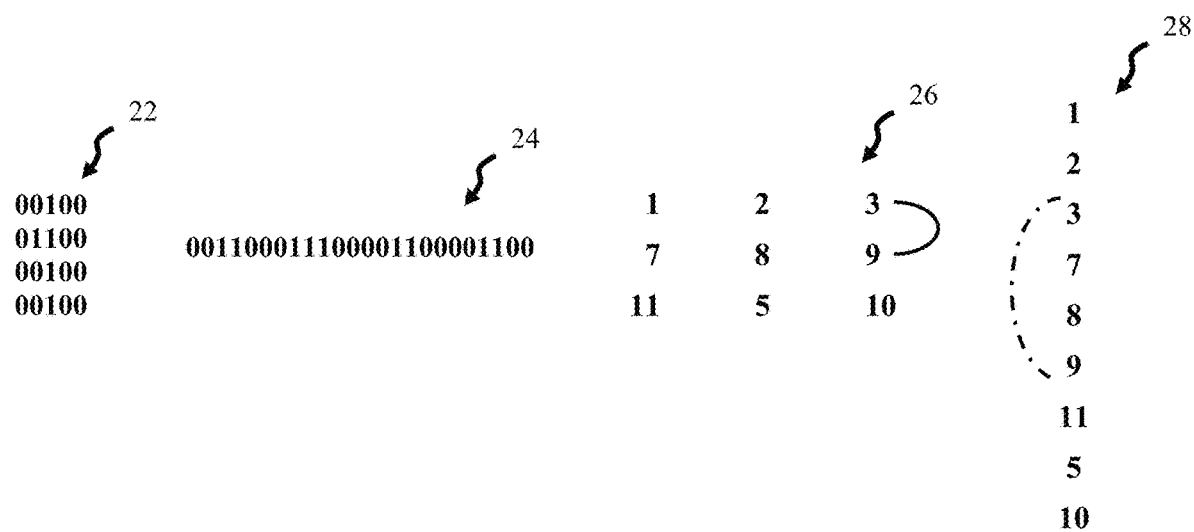
FIG. 2 is a diagram illustrating a loss of spatial layout information during flattening according to an embodiment of the present invention.

Similarly, the spatial adjacencies of the intensity values across a column are apparent in the two-dimensional layout 26 in FIG. 2. See, for example, the intensity values 3 and 9 which are adjacent to one another in the rightmost column of two-dimensional layout 26. However, this spatial contiguity and layout information are lost in the flattening. See the corresponding flattened representation 28 where, for example, the spatial adjacencies of intensity values 3 and 9 is not preserved.

Advantageously, in accordance with the present techniques, the spatial layout information encoded in these two-dimensional layouts is preserved during the flattening step. Preserving the spatial layout information during the flattening step makes it possible to distinguish between location-specific anomalies better during classification. As will be described in detail below, techniques are provided herein for preserving the spatial information (also referred to herein as 'spatially preserving flattening') by (i) capturing the shape information conveyed in the filtered representations during feature extraction, and (ii) keeping the identities of the filters separate during the flattening. Regarding shape information, the feature map of each filter highlights different regions in the image. For instance, some filters are looking in the center of the image, others to the left or right, etc. As those regions are examined, the highlighted intensity itself forms a shape which may resemble underlying objects in the image. Thus, the shape information refers to the shape of these intensity regions in the feature map. Further, a specific place is reserved in the saliency vector for each feature region. As such, one can recover from the features, which filters they came from thus preserving their identity.

In general, the present spatially preserving flattening can be applied to the feature maps from any of the convolutional layers during feature extraction. However, it may be preferable to use the last layer of the feature extraction phase in order to benefit from the local and global image characteristics captured in the filters. Local image characteristics are captured in the feature maps extracted from the intermediate convolutional layers of the convolutional neural network, whereas the global image characteristics are captured in the feature maps output from the model through pooling. Thus, according to an exemplary embodiment, a spatially preserving flattening using auto-encoding of the feature maps is implemented between the feature extraction phase and the dense, fully connected classification phase to make a novel end-to-end deep learning network, as shown in FIG. 1. This unique process is referred to herein as spatially preserving deep learning.

Given the above overview, details regarding the use of auto-encoding of feature maps during flattening to preserve location and shape information are now provided. The convolutional filters in a deep learning network learn to detect image characteristics at specific locations in either the direct image (at the input layer) or its successive abstractions obtained through pooling operations capturing more global characteristics. As provided above, the result of applying these filters to an input image generates image feature maps (or simply 'feature maps') which highlight the relevant features detected or preserved in the input by the filter. While feature maps close to the input detect small or fine-grained detail, and feature maps close to the output of the model capture more general features, each feature map can be seen as defining a shape. See, for example, FIG. 3 which illustrates spatially preserving flattening in an exemplary convolutional neural network architecture that is 50 layers deep using the filters from the second convolutional layer. In this example, the feature maps produced by applying the filters in the second convolutional layer (conv1conv layer) consist of 64 filters of 16×16 each. The corresponding 64 feature maps 304 produced using the convolutional neural network from an input image 302 are shown in block 306. It is notable that the filters are used to project back in image space and the rest of the operations for producing the feature maps are derived from the image space rather than the filter space.

An auto-encoder is used to learn codings of data. An auto-encoder is composed of an encoder and a decoder. The encoder finds a representation or encoding of high-dimensional data in a lower dimension by focusing on the important features and getting rid of noise and redundancy. The decoder takes the low-dimensional encoding and attempts to regenerate the original high-dimensional input, thereby validating the encoding. Thus, since auto-encoders form a low-dimensional representation or encoding of shapes, it has been found herein that each of the feature maps 304 can be represented using an auto-encoder to inherently preserve its spatial information.

Figure 3:
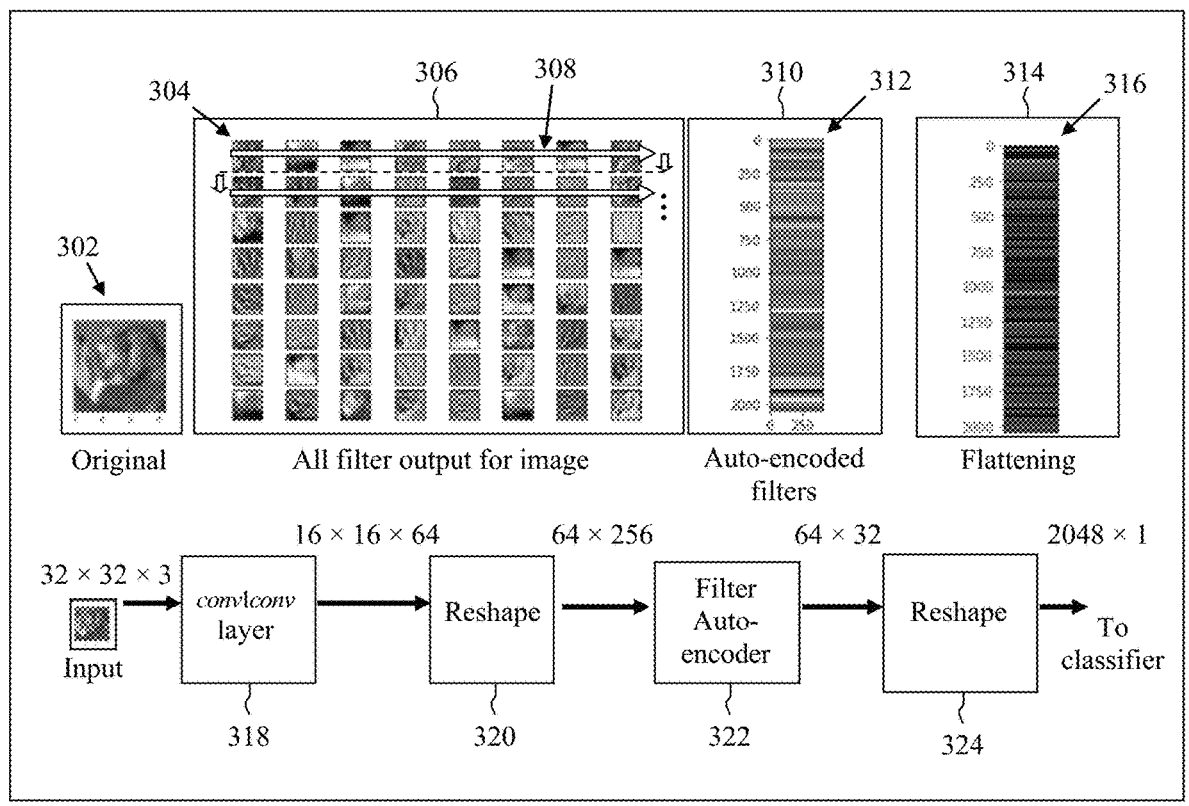
FIG. 3 is a diagram illustrating spatially preserving flattening according to an embodiment of the present invention.

Further, by concatenating all the encodings of the feature maps, a novel (spatially preserving) flattened encoding vector is formed that separately retains the location and shape information from each of the individual feature maps. Namely, as provided above, since an auto-encoder is able to reproduce the shape of an object, it can be said that the auto-encoder encodes the shape information and retains it well enough to be reproduced. The shape of an object shows adjacent regions (spatial continuity) and also captures inherent positional information. According to an exemplary embodiment, a fixed ordering is used among the feature maps to define the layout of their encodings. For instance, block 310 in FIG. 3 shows the resulting (spatially preserving) flattened encoding vector 312 generated from the auto-encoding of the feature maps 304. As indicated by arrows 308, a left to right, top to bottom ordering of the feature maps 304 is used in this example. Of course, other ordering schemes can be employed, as long as they are used consistently throughout the encodings. As shown in this example, the identities of the feature maps (and thus of the corresponding filters) are kept separate (i.e., the separate identities of the individual feature maps/filters are preserved) during the flattening which, as highlighted above, is a key feature of the present techniques. Namely, a feature map is produced for each of the filters. Thus, by producing auto-encodings of each of the feature maps 304 and then arranging the auto-encodings of all of the feature maps into the flattened encoding vector 312 using a fixed ordering, each of the feature maps (and thus the corresponding filters) can be individually identified based on its specific position in the flattened encoding vector 312 (i.e., a saliency vector).

In this example, a 32-bit representation auto-encoder was used for each of the feature maps 304 resulting in a flattened encoding vector of size 64×32=2048×1. For comparison, a (non-spatially preserving) flattening 316 obtained by a traditional convolutional neural network prior to classification, which also generates a 2048×1 vector, is shown in block 314. As can be seen by their intensity renderings, the (spatially preserving) flattened encoding vector 312 shows more discriminable intensity values than flattening 316, intuitively supplying the basis for improvement in subsequent classification.

As shown in FIG. 3, the feature map and flattened encoding vector data input to the classifier may be reshaped. Namely, the feature maps 304 from the second convolutional layer (block 318) that is fed to the auto-encoder (block 322) is reshaped (block 320). In turn, the flattened encoding vector from the auto-encoder (block 322) that is fed to the classifier is reshaped (block 324).

It is notable that, while feature maps from the second convolutional layer were used in this example, as highlighted above it is preferred to use the last layer of the feature extraction stage to benefit from both the local and global image characteristics captured in the filters. Specifically, according to an exemplary embodiment, a spatially preserving flattening module with an auto-encoder is introduced in between the feature extraction and classification phases to create a novel end-to-end deep learning network. End-to-end learning means that the model learns all of the steps between the input phase and the final output. By this end-to-end deep learning process, the different parts of the model are trained simultaneously. For instance, as will be described in detail below, the present auto-encoders are (simultaneously) learned while the main classification task is in progress.

Figure 4:
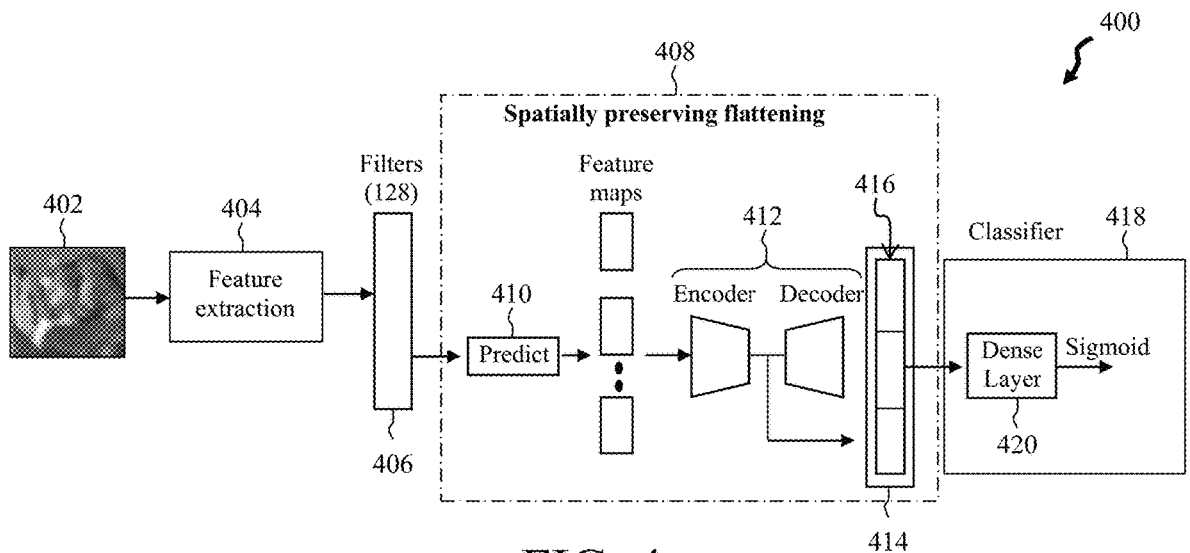
FIG. 4 is a diagram illustrating an exemplary deep learning neural network having a spatially preserving flattening module in between the feature extraction and classification phases according to an embodiment of the present invention.
Figure 5:
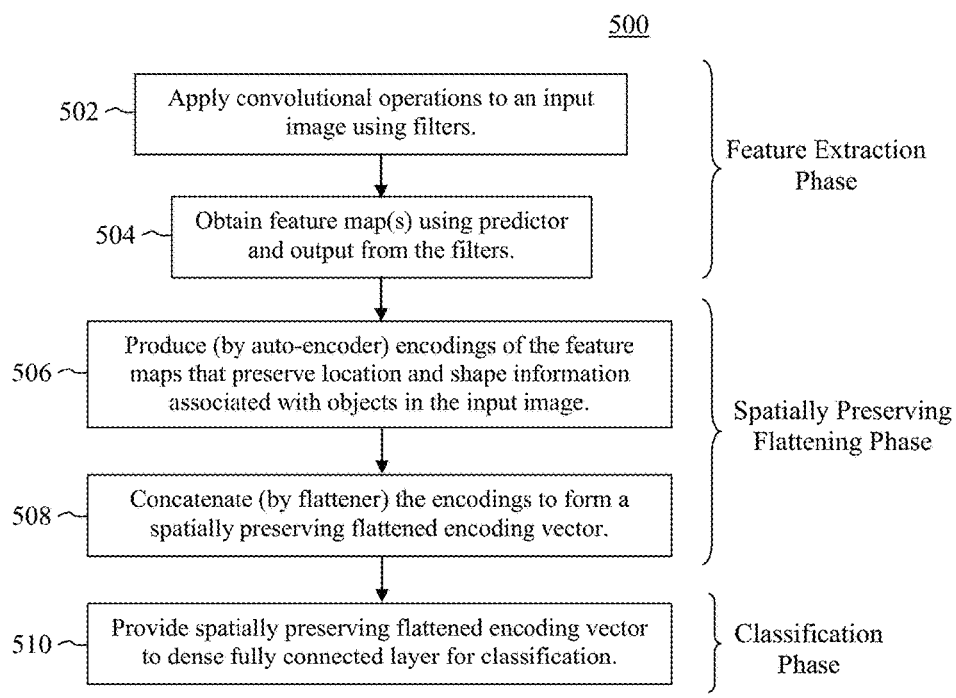
FIG. 5 is a diagram illustrating an exemplary methodology for use of the deep learning neural network of FIG. 4 for classification with spatially preserving flattening according to an embodiment of the present invention.

An exemplary end-to-end deep learning network and techniques for use thereof are now described by way of reference to FIG. 4 and FIG. 5. Namely, FIG. 4 is a diagram illustrating an exemplary deep learning neural network 400 having a spatially preserving flattening module in between the feature extraction and classification phases in accordance with the present techniques. FIG. 5 is a diagram illustrating an exemplary methodology 500 for use of deep learning neural network 400 for classification with spatially preserving flattening.

Referring to FIG. 4 and step 502 of methodology 500 of FIG. 5, given a digital input image 402, a feature extractor 404 of deep learning neural network 400 uses filters 406 to apply convolutional operations to the input image 402. As described in detail above, a feature map is obtained for each of the filters that maps the relevant features detected or preserved by the filters (see below) during the feature extraction phase. It is notable that, while the present example involves the use of a still image as input, the present techniques are more generally applicable to the use of any digital input image data including, but not limited to, a digital image or series of digital images and/or digital video data.

A spatially preserving flattening module 408 then takes the output from the filters 406 and generates a (spatially preserving) flattened encoding vector from auto-encodings of the feature maps. Advantageously, through auto-encoding of the feature maps, the flattened encoding vector retains the location and shape information of objects in the input image 402 that is conveyed by the filters 406.

Specifically, spatially preserving flattening module 408 includes a predictor 410, an auto-encoder 412, and a flattener 414. Referring to FIG. 4 and step 504 of methodology 500 of FIG. 5, at least one feature map is obtained using the predictor 410 and output from the filters 406. According to an exemplary embodiment, filters 406 are the filters from the last convolutional layer of the feature extractor 404 in deep learning neural network 400 applied to the input image 402. As highlighted above, taking output from the last convolutional layer of the feature extractor 404 is done to benefit from both the local and global image characteristics captured in the filters.

Referring to FIG. 4 and step 506 of methodology 500 of FIG. 5, the feature maps from predictor 410 are provided to the auto-encoder 412 which produces encodings of the feature map(s) that preserve location and shape information associated with objects in the input image 402. As highlighted above, with the end-to-end deep learning network architectures provided herein the auto-encoder 412 learns the layout shapes of the feature extraction layers while the main classification task of deep learning neural network 400 is in progress. Specifically, an auto-encoder is a type of neural network that is used to learn encodings of data in an unsupervised manner. As shown in FIG. 4, the auto-encoder 412 is composed of an encoder and a decoder. The encoder finds low-dimensional representations (also referred to herein as 'encodings') of the feature maps by training the network to capture the most important parts of the input image 402. This training of auto-encoder 412 is carried out simultaneously with the main classification task, thereby enabling the learning of encodings that are optimal for spatially preserving flattening as well as for subsequent classification. The decoder is used to regenerate the original high-dimensional input from the encodings. The present techniques leverage the fact that these low-dimensional encodings of the feature maps by the encoder inherently preserve the location and shape (i.e., spatial) information of the objects in the input image 402.

Referring to FIG. 4 and step 508 of methodology 500 of FIG. 5, the encodings of the feature maps from auto-encoder 412 are provided to the flattener 414. The flattener 414 concatenates (i.e., links together) the encodings of the feature maps to generate a (spatially preserving) flattened encoding vector 416. According to an exemplary embodiment, the auto-encoder 412 and flattener 414 use a fixed ordering among the feature maps. For instance, by way of non-limiting example, a left to right, top to bottom ordering of the feature maps can be employed as described above. In that case, the flattened encoding vector 416 is filled in the order of the feature maps, i.e., the encodings for each of the feature maps are successively assembled according to the fixed ordering to form the overall flattened encoding vector 416 for classification. By employing a fixed ordering among the feature maps, a layout of the encodings in the resulting flattened encoding vector 416 can be defined which keeps the identities of the feature maps (and thus of the corresponding filters 406) separate during the flattening which, as highlighted above, is a key feature of the present techniques. Namely, as described above, a feature map is produced for each of the filters 406. Thus, by producing auto-encodings of each of the feature maps (by auto-encoder 412) and then arranging the auto-encodings of all of the feature maps into the flattened encoding vector 312 (flattener 414) using a fixed ordering, each of the feature maps (and thus the corresponding filters 406) can be individually identified in the resulting flattened encoding vector 416.

Referring to FIG. 4 and step 510 of methodology 500 of FIG. 5, output from the spatially preserving flattening module 408 is then provided to a classifier 418. Namely, the flattened encoding vector 416 produced by flattener 414 is provided as input to a dense, fully connected layer 420 for classification of the objects in the input image 402. According to an exemplary embodiment, sigmoid activation is used to allow multi-label classification.

In the non-limiting example shown illustrated in FIG. 4, the last stage of the feature extractor 404 generates 128 filters of size 64×64. As described above, the predictor 410 predicts feature maps using these 128 filters. In that case, a 128-bit auto-encoder 412 is then used to encode each of the 128 incoming 512×512 feature maps produced by the predictor 410. The flattener 414 then arranges the 128 encodings of all of the feature maps into a 16,384 length (spatially preserving) flattened encoding vector 416. The flattened encoding vector 416 is then given as input to the dense, fully connected layer 420 of classifier 418 for classification of the objects in the input image 402.

As provided above, one application of deep learning which requires that layout and spatial contiguity information be maintained is anomaly detection in medical images such as X-ray images where the recognition of anomalies within particular anatomical regions is needed. Advantageously, the present spatially preserving deep learning techniques can be effectively implemented in domain-specific deep learning neural network architectures such as those suitable for fine-grained anomaly classification in X-ray images. See, for example, FIG. 6.

As in the previous example, the present spatially preserving flattening module 408 is implemented in between a feature extractor and the dense, fully connected layer 420 of the classifier 418 in order to benefit from the local and global image characteristics captured in the filters. It is notable that like structures are numbered alike in the figures for clarity.

Figure 6:
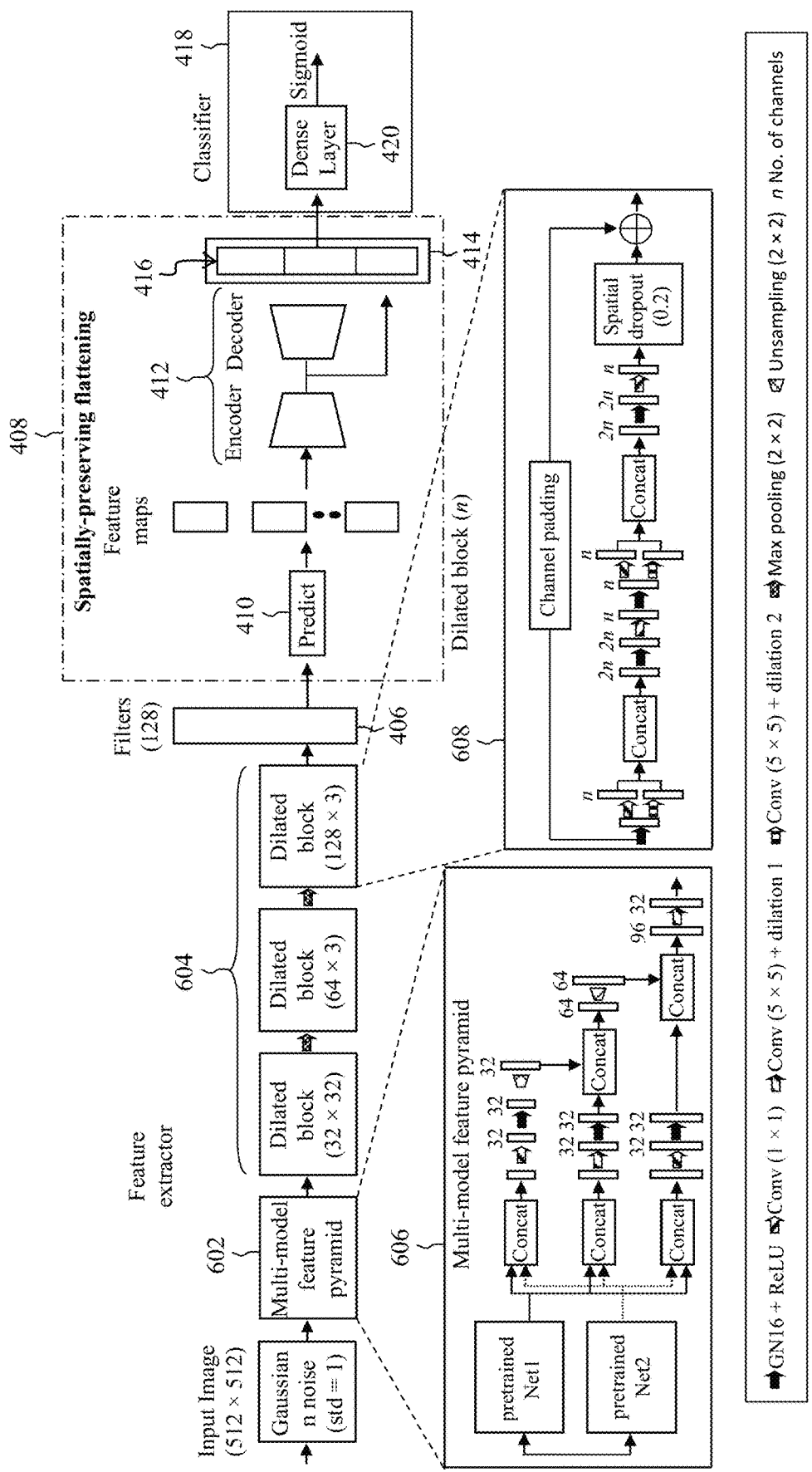
FIG. 6 is a diagram illustrating an exemplary domain-specific spatially preserving flattening deep learning neural network architecture according to an embodiment of the present invention.

In this example, however, the feature extractor uses a multi-model feature pyramid 602 to allow for multi-resolution analysis of an input image, and a cascade of dilated blocks 604 with skip connections to improve performance and convergence, while spatial dropout is used to reduce overfitting. Skip connections bypass some of the layers in the neural network and provides the output of one layer as the input to the next layers. As shown in FIG. 6, dilated blocks with different feature channels are cascaded with max pooling (i.e., forming the cascade of dilated blocks 604) in order to learn more abstract features.

Specifically, expanded view 606 of the multi-model feature pyramid 602 illustrates that two pre-trained standard deep neural networks, Net1 and Net2, are used as initial feature extractors and their lower-level features are retained. According to an exemplary embodiment, Net1 is deep neural network that is 16 layers deep and Net2 is deep neural network that is 50 layers deep, and both were trained on multi-million images from a publicly available image database. In one illustrative embodiment, from the Net1, feature maps with 128, 256, and 512 feature channels are used, which are concatenated (Concat) with the feature maps from the Net2 of the same spatial sizes which have 256, 512, and 1024 feature channels.

As shown in FIG. 6, the cascade of dilated blocks 604 is present in between the multi-model feature pyramid 602 and the spatially preserving flattening module 408. Namely, dilated blocks are used to learn the high-level features from the extracted features. Namely, as expanded view 608 of one of the dilated blocks illustrates, each dilated block is composed of dilated convolutions for multi-scale features, and uses a skip connection of identity mapping to improve convergence and spatial dropout to reduce overfitting. Dilated convolution is a technique that is used to expand the input by pixel skipping so as to cover a larger area of the input. Group normalization, e.g., 16 groups (GN16) is also used with Rectified Linear Unit (ReLU) as the activation function. As highlighted above, the dilated blocks with different feature channels are cascaded with max pooling to learn more abstract features.

The last stage of the feature extractor generates 128 filters 406 of size 64×64. The spatially preserving flattening module 408 takes the output from these filters 406 and generates a (spatially preserving) flattened encoding vector that advantageously retains the location and shape information of objects in the input image that is conveyed by the filters 406. Namely, as described in detail above, spatially preserving flattening module 408 includes predictor 410, auto-encoder 412, and flattener 414.

The predictor 410 predicts at least one feature map using the output from the filters 406. The auto-encoder 412 then produces encodings of the feature map(s) obtained from the predictor 410. As highlighted above, the present techniques leverage the fact that the encodings of the feature maps by the auto-encoder 412 inherently preserve the location and shape (i.e., spatial) information of the objects in the input image. The flattener 414 concatenates the encodings of the feature maps from the auto-encoder 412 to generate a (spatially preserving) flattened encoding vector 416. According to an exemplary embodiment, the flattener 414 uses a fixed ordering among the feature maps (e.g., a left to right, top to bottom ordering) to define a layout of the encodings in the resulting flattened encoding vector 416. Finally, the classification was done through the dense, fully connected layer 420 of classifier 418 with sigmoid activation to allow multi-label classification.

In the non-limiting example shown illustrated in FIG. 6, a 128-bit auto-encoder 412 is used to encode each of the 128 incoming 512×512 feature maps produced by the predictor 410. The flattener 414 then arranges the 128 encodings of all of the feature maps into a 16,384 length (spatially preserving) flattened encoding vector 416. The flattened encoding vector 416 is then given as input to the dense, fully connected layer 420 of classifier 418 for classification of the objects in the input image.

The overall network was trained end-to-end using an optimizer for fast convergence, with the learning rate as $2\times10^{-6}$. Two graphics processing units with 16 gigabyte memory were used for multi-graphics processing unit training with a batch size of 12 over 30 epochs.

Figure 7:
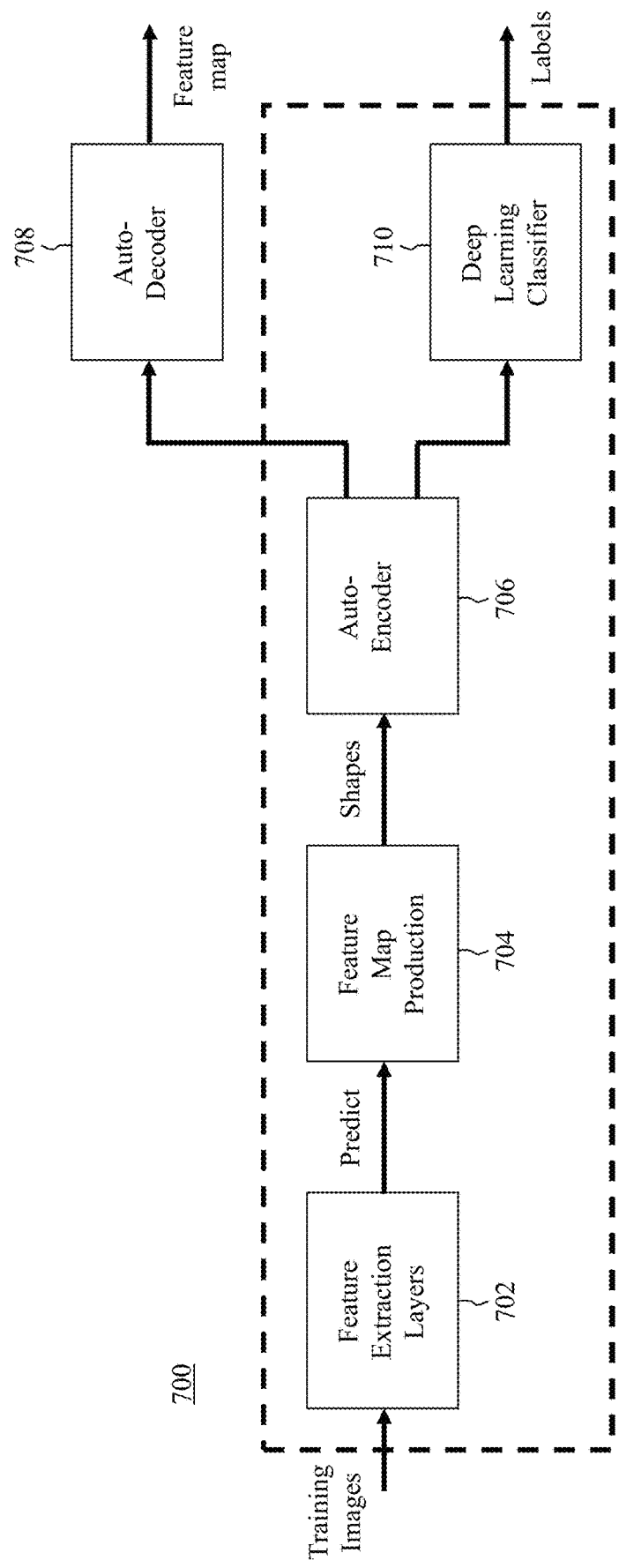
FIG. 7 is a diagram illustrating an exemplary methodology for auto-encoder training according to an embodiment of the present invention.

As highlighted above, with the present spatially preserving deep learning neural networks, the auto-encoder is trained while the main classification task is in progress. Doing so advantageously enables the production of location-specific and spatially preserving representations (encodings) via the flattened encoding vector that are tuned for the classification task. As shown in FIG. 7, the encoder-decoder pair of the present auto-encoder design provides the mechanism for enabling this end-to-end network architecture. Namely, FIG. 7 is a diagram illustrating an exemplary methodology 700 for auto-encoder training. For clarity, methodology 700 is now described in the context of the exemplary deep learning neural network 400 of FIG. 4 above. However, the method may be generally applied to any of the auto-encoding network architectures described herein. As previously noted, like structures are numbered alike throughout the figures.

Referring to FIG. 7, in step 702 at least one layer of feature extractor 404 uses filters 406 to apply convolutional operations to a set of training images. In step 704, feature maps are produced using predictor 410 and output from the filters 406. As detailed above, a feature map is obtained for each of the filters 406 that maps the relevant features detected or preserved by the filters 406 during the feature extraction phase.

The encoder component of auto-encoder 412 learns to capture the most important parts of the training images and, in step 706, produces low-dimensional representations (encodings) of the (high-dimensional) feature maps. As described in detail above, the goal is to use these encodings to encode the shape of objects in the training images and retain it well enough to be reproduced (i.e., spatially preserving). Thus, in step 708 the decoder component of auto-encoder 412 is used to regenerate the original high-dimensional feature maps, and thereby validate the encodings. This represents the training process by which the auto-encoder 412 learns to generate spatially preserving encodings of the feature maps. Simultaneous with that training process, the main classification task is also being performed. Namely, in the same manner as described above, flattener 414 is used to assemble those encodings from the encoder component of auto-encoder 412 into a flattened encoding vector 416 which, in step 710, is provided as input to the dense, fully connected layer 420 for classification. The present techniques are now further described by way of reference to the following non-limiting examples. The spatially preserving deep learning network described herein was used for location-specific finding classification in chest X-rays. A set of location-specific labels previously catalogued for a large collection of chest X-ray images was used in this implementation. Specifically, this was a multi-institutional dataset collected from two reference sources, one a database of 377,110 labeled chest x-rays associated with 227,827 imaging studies (dataset 1), and the other a chest x-ray that includes 108,948 frontal-view X-ray images of 32,717 unique patients with the text-mined eight disease image labels (where each image can have multi-labels) from the associated radiological reports using natural language processing (dataset 2). These X-rays showed a wide range of clinical settings, including intensive care units, urgent care, in-patient care, and emergency departments and represented a wide variety of chest X-ray findings in anteroposterior (AP), posteroanterior (PA) and portable modes of acquisition. A full list of 457 findings in chest X-rays had been catalogued in an earlier work using text analytics on the accompanying radiology reports associated with these images. Here, a subset of 57 of the 457 labels was selected from this label set that refer to either laterality or anatomical location and were most frequently found in radiology reports. A subset of these labels is shown in FIG. 8. Macro area under the curve (AUC) is shown for the present spatially preserving deep learning network (Network A) and two other publicly-available deep learning networks for object detection (Network B and Network C).

Since these labels had already been verified, the labeled dataset was used to train, validate, and test the present spatially preserving deep learning network for fine-grained finding classification. A 70-10-20% split was used for training, validation and testing. Although the full dataset consisted of 335,189 chest X-rays and their reports, the dataset available for the 57 finding labels was found to contain 107,169 chest X-ray images.

By using spatially preserving encodings from feature maps for classification, the present spatially preserving deep learning network was able to predict the location of specific labels reliably. Since the location-specific details were already included in the label, the AUC measured the combined accuracies of anatomy and anomaly classification. The weighted AUC for the 57 labels was found to be 0.81.

The performance of the present spatially preserving deep learning network was compared against two other approaches, namely, those using an anatomical atlas to separate anatomy detection from anomaly location, and those that use a whole image approach to directly recognize location-specific labels. Since those networks were trained on different sets of labels, an evaluation was done on the same subset of 57 anatomy-specific findings chosen above. Specifically, for the atlas approach, a network framework (N1) using a set-based global loss that forces unique predictions via bi-partite matching, and a transformer encoder-decoder architecture was implemented. This network was trained on the automatically extracted bounding box regions obtained by applying the anatomical atlas to the training and testing images. Specifically, this bounding box approach is anatomically standardized to the upper, middle, and lower lung zones for the left and right lungs, and is composed of two stages. In the first stage, a lungs segmentation model and an atlas of normal patients are used to mark six lung zones on the image with standardized bounding boxes. In the second stage, the associated radiology report is used to label each lung zone as positive or negative for finding, resulting in a set of six labeled bounding boxes per image. Finally, a previously-developed feature pyramid network (N2) for fine-grained classification having dilated blocks composed of multiscale features and skip connections to improve convergence, and spatial drop to reduce overfitting, was used to provide a comparison to conventional non-spatially preserving encoding-based fine-grained classification. All networks used the same splits for train and test as shown in FIG. 9, and the same set of 57 labels. The first and second columns from the left in FIG. 9 list the method and the number of labels, respectively. As can be seen, the average AUC obtained by the present spatially preserving deep learning network (N3) is at least 15% higher than the comparable methods (N1 and N2). The performance for individual fine-grained labels is shown in FIG. 8.

An ablation study was also conducted to see the effect of the use of spatially preserving flattening over conventional flattening. Since the comparison network N2 used this conventional form of flattening, the results in FIG. 8 and FIG. 9 constitute the ablation study for the flattening. Another ablation study was also performed by changing the size of the auto-encoding for the feature maps and selecting the filters from different layers of the feature extraction stage. The effect of auto-encoding sizes on the average AUC performance is shown in FIG. 10, indicating that the size of the encoding chosen for producing the feature maps was appropriate for the image sizes being handled in a network for chest X-rays. The train and test splits of the network shown in FIG. 10 are the same as in FIG. 9.

As will be described below, the present techniques can optionally be provided as a service in a cloud environment. For instance, by way of example only, one or more steps of methodology 500 of FIG. 5 and/or one or more steps of methodology 700 of FIG. 7 can be performed on a dedicated cloud server.

The predictor 410 described herein refers to the convolutional layers of a deep learning network, and the 'prediction' refers to the inference step of obtaining the feature maps from the convolutional layers. According to an exemplary embodiment, the flattener 414 described herein is a single layer in a deep learning network that changes the dimensions of the Tensor provided as input so that the output is a single concatenated feature vector, which is then passed to linear layers for final prediction of the output.

Figure 11:
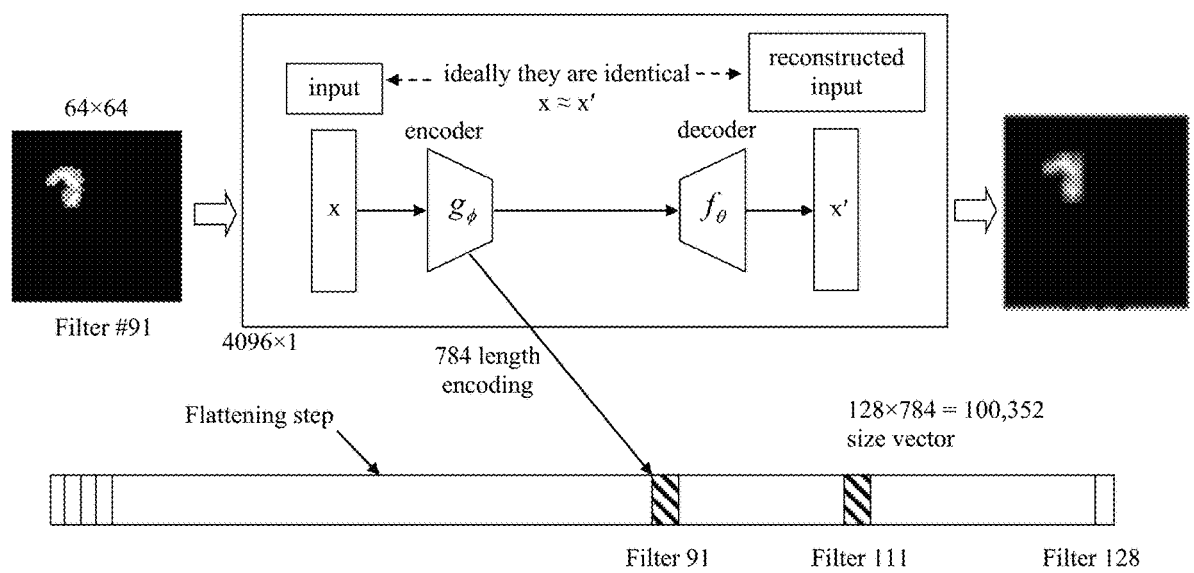
FIG. 11 is a diagram illustrating an exemplary arrangement process to obtain flattening according to an embodiment of the present invention.

FIG. 11 is a diagram illustrating how each feature map can be encoded to capture its shape and laid out in a combined feature vector for flattening by the flattener 414. Namely, as described above, there are three components in the convolutional neural network, a set of feature extraction layers using convolutional filters, a flattening operation to covert the multi-dimensional tensor input into a one-dimensional vector, followed by fully-connected neural network layers. Referring to FIG. 11 for example, if there are 128 filters in the last feature extraction layer, each of size 64×64, then going across the 128 filters and taking their average at every point, the resulting vector will be a 4096×1 vector (=64*64× 1). This will be given as a vector for the neural network to classify. The present techniques provide a different way of flattening altogether in which flattener 414 concatenates the encodings from each of the filters retaining the filter identity and hence their respective shape in the process. So, for example, if a 32 bit encoding is done for the same filters, flattener 414 will also have the same size 4096×1 but will be arranged as blocks of 32 each, i.e., 32×128 since the 64×64 filter would have been reduced to a 32 bit encoding that is designed to recover the shape (as it was trained through the auto-encoder 412). Thus, the present techniques provide a novel process and architecture for capturing the shape of the filter through the auto-encoder 412, a new way of flattening that preserves the identity of the filter and their shape encodings, and finally, training the auto-encoder 412 end-to-end with the target downstream task (in this case classification).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 12:
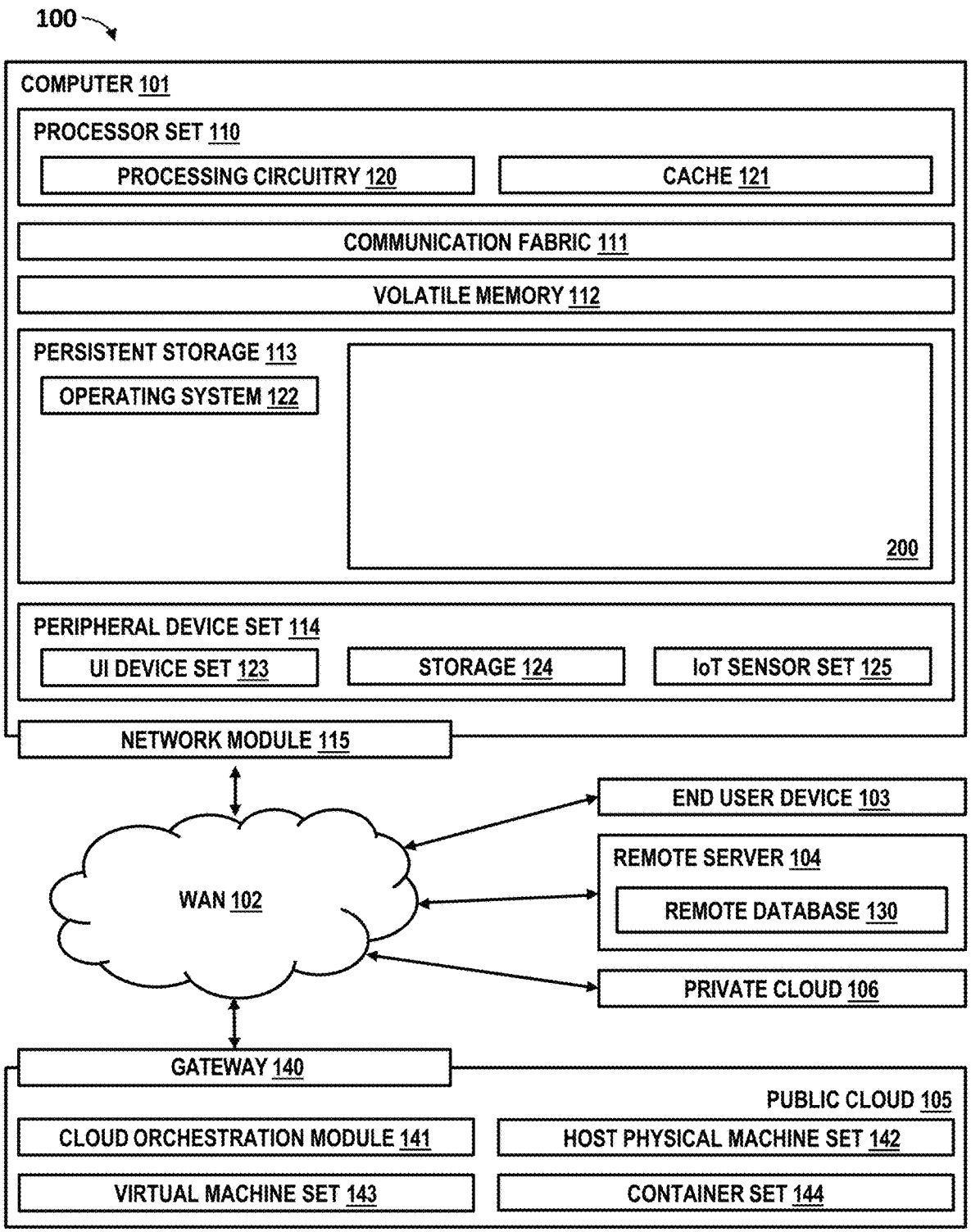
FIG. 12 is a diagram illustrating an exemplary computing environment according to an embodiment of the present invention.

Referring to FIG. 12, computing environment 100 contains an example of an environment for the execution of at least some of the computer code involved in performing the inventive methods, such as spatially preserving flattening code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 12. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A spatially preserving flattening module, comprising:
a predictor for generating image feature maps from at least one convolutional layer of a feature extraction phase of a deep learning neural network applied to input image data, wherein the predictor uses filters from a last convolutional layer of the feature extraction phase to generate the image feature maps;
an auto-encoder for producing encodings of the image feature maps that preserve location and shape information associated with objects in the input image data; and
a flattener for concatenating the encodings of the image feature maps to form a spatially preserving flattened encoding vector, wherein identities of the image feature maps are kept separate during formation of the spatially preserving flattened encoding vector, and wherein a fixed ordering among the image feature maps is used by the auto-encoder and the flattener to define a layout of the encodings in the spatially preserving flattened encoding vector.

2. The spatially preserving flattening module of claim 1, wherein the auto-encoder comprises an encoder-decoder pair for learning the encodings of the image feature maps while a classification task of the deep learning neural network is in progress.

3. The spatially preserving flattening module of claim 1, wherein the input image data is selected from a group consisting of: a digital image, a series of digital images, a digital video, and combinations thereof.

4. The spatially preserving flattening module of claim 1, wherein the predictor uses filters from a last convolutional layer of the feature extraction phase to generate the image feature maps.

5. A computer system for a deep learning neural network comprising:
one or more processors;
a memory coupled to at least one of the processors;
a set of computer program instructions stored in the memory and executed by at least one of the processors in order to perform actions of:
applying by a feature extractor convolutional operations to input image data using filters;
spatially preserving, by a flattening module, wherein the flattening module comprises: a predictor for generating image feature maps using output from the filters, an auto-encoder for producing encodings of the image feature maps that preserve location and shape information associated with objects in the input image data, and a flattener for concatenating the encodings of the image feature maps to form a spatially preserving flattened encoding vector, wherein identities of the image feature maps are kept separate during formation of the spatially preserving flattened encoding vector, and wherein a fixed ordering among the image feature maps is used by the auto-encoder and the flattener to define a layout of the encodings in the spatially preserving flattened encoding vector; and
classifying by a classifier, wherein the classifier comprises a dense fully connected layer for classifying the objects in the input image data using the spatially preserving flattened encoding vector.

6. The deep learning neural network of claim 5, wherein the auto-encoder comprises an encoder-decoder pair for learning the encodings of the image feature maps while the classifying of the objects in the input image data is in progress.

7. The deep learning neural network of claim 5, wherein the filters are from a last convolutional layer of the feature extractor.

8. The deep learning neural network of claim 5, wherein the feature extractor comprises:
a multi-model feature pyramid for multi-resolution analysis; and
a cascade of dilated blocks in between the multi-model feature pyramid and the spatially preserving flattening module.

9. The deep learning neural network of claim 8, wherein dilated blocks with different feature channels are cascaded with max pooling to form the cascade of dilated blocks.

10. A method for spatially preserving flattening, the method comprising:
keeping identities of multiple image feature maps separate during formation of spatially preserving flattened encoding vector;
obtaining at least one image feature map from at least one convolutional layer of a feature extraction phase of a deep learning neural network applied to input image data, wherein multiple image feature maps are obtained from the input image data during the feature extraction phase, wherein the multiple image feature maps are auto-encoded to produce encodings of the multiple image feature maps, and wherein the method further comprises:
concatenating the encodings of the multiple image feature maps to form the spatially preserving flattened encoding vector that retains location and shape information from each of the multiple image feature maps;
keeping identities of the multiple image feature maps separate during formation of the spatially preserving flattened encoding vector;
using a fixed ordering among the multiple image feature maps to define a layout of the encodings in the spatially preserving flattening encoding vector; and auto-encoding the at least one image feature map to produce an encoding of the at least one image feature map, wherein the auto-encoding preserves location and shape information associated with objects in the input image data.

11. The method of claim 10, further comprising:
learning the encoding of the at least one image feature map while a classification task of the deep learning neural network is in progress.

12. The method of claim 10, wherein the at least one image feature map is obtained using filters from a last convolutional layer of the feature extraction phase.

13. The method of claim 10, further comprising:
providing the spatially preserving flattened encoding vector to a dense fully connected layer for classification.

* * * * *